United States Patent [19]

Smith, II

[11] 4,086,687
[45] May 2, 1978

[54] APPARATUS FOR RELAXING OR LOOSENING NEEDLED TEXTILE FABRICS

[75] Inventor: Alexander M. Smith, II, Elkin, N.C.

[73] Assignee: The Fiberwoven Corporation, Elkin, N.C.

[21] Appl. No.: 479,141

[22] Filed: Jun. 13, 1974

Related U.S. Application Data

[63] Continuation-in-part of Ser. No. 221,614, Jan. 28, 1972, Pat. No. 3,817,820.

[51] Int. Cl.$^2$ .............................................. D04H 1/48
[52] U.S. Cl. ...................................... 28/103; 26/18.6; 28/112
[58] Field of Search ............ 19/155; 28/41 R, 72.2 R, 28/103, 112; 26/18.6

[56] References Cited

U.S. PATENT DOCUMENTS

| | | | |
|---|---|---|---|
| 1,982,720 | 12/1934 | Woodhead | 26/18.6 |
| 2,084,367 | 6/1937 | Woodhead | 26/18.6 |
| 2,263,712 | 11/1941 | Wrigley et al. | 26/18.6 |
| 2,409,898 | 10/1946 | Ramsdell | 19/155 |
| 2,513,893 | 7/1950 | Ramsdell | 19/155 |
| 2,835,047 | 5/1958 | Fleissner et al. | 26/18.6 UX |
| 3,015,145 | 1/1962 | Cohn et al. | 26/18.6 |
| 3,015,146 | 1/1962 | Cohn et al. | 26/18.6 |
| 3,236,718 | 2/1966 | Cohn et al. | 26/18.6 X |
| 3,287,784 | 11/1966 | Loftin et al. | 26/18.6 UX |
| 3,364,543 | 1/1968 | Homier et al. | 28/72.2 R |
| 3,570,085 | 3/1971 | Heinemann | 26/18.6 X |
| 3,810,280 | 5/1974 | Walton et al. | 26/18.6 |

FOREIGN PATENT DOCUMENTS

| | | | |
|---|---|---|---|
| 1,080,510 | 4/1960 | Germany | 26/18.6 |
| 940,794 | 11/1963 | United Kingdom | 19/155 |

*Primary Examiner*—Robert R. Mackey
*Attorney, Agent, or Firm*—Cushman, Darby & Cushman

[57] ABSTRACT

Apparatus for loosening the needled structure of a textile fabric. A moveable surface having penetrating elements which penetrate the fabric, produce planar forces on the internal fibers of the fabric. A co-operating surface provides an opposite force to that exerted by the moveable surface. The moveable surface moves at a different speed than the cooperating surface and compressive forces are applied to the internal fibers of the fabric at discrete points by the penetrating elements, and internal fibers are moved relative to other fibers.

30 Claims, 11 Drawing Figures

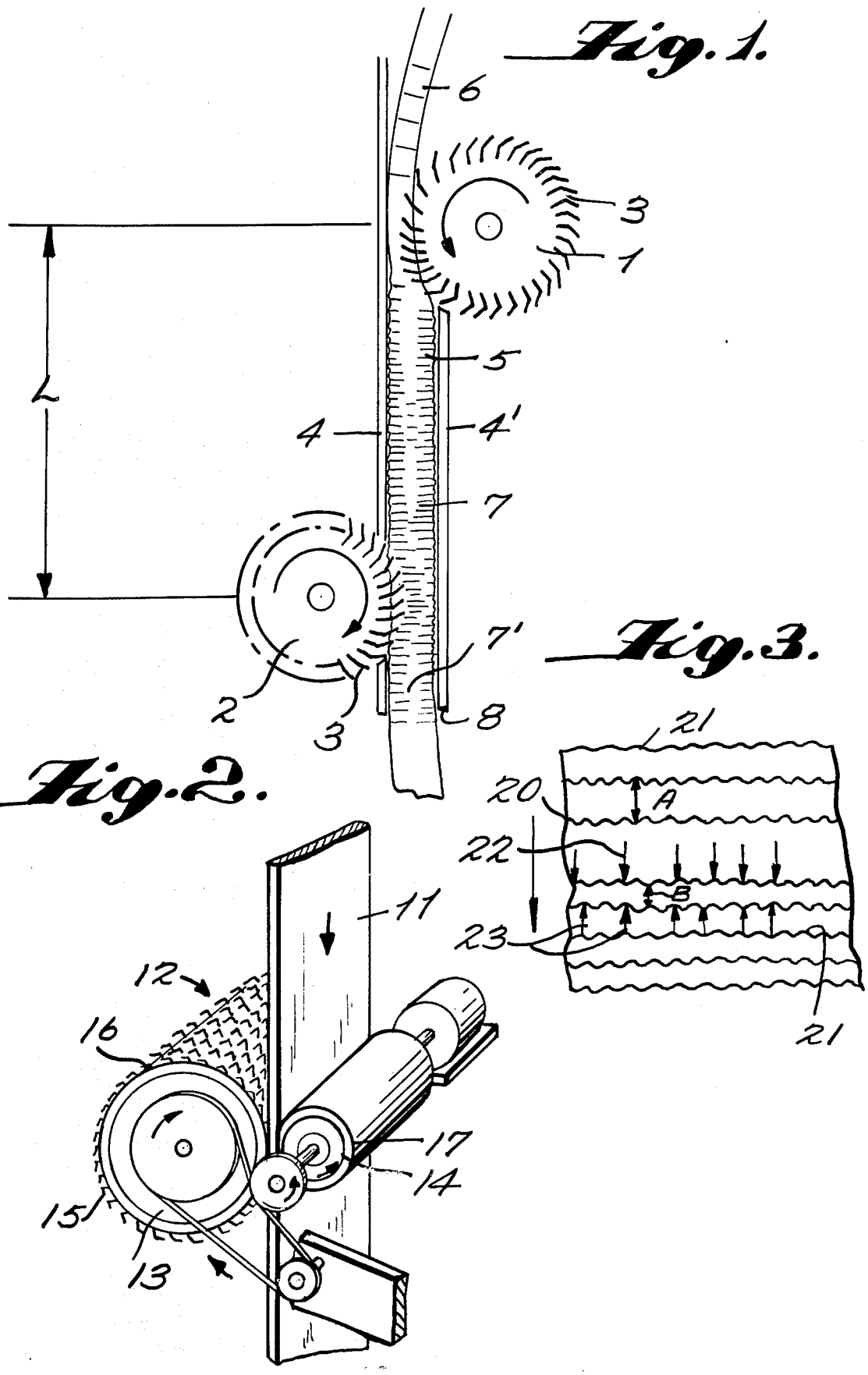

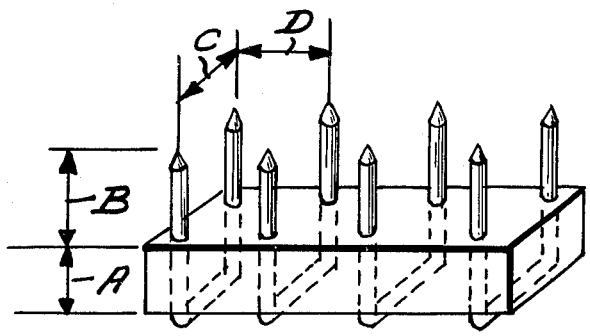
*Fig. 9.*
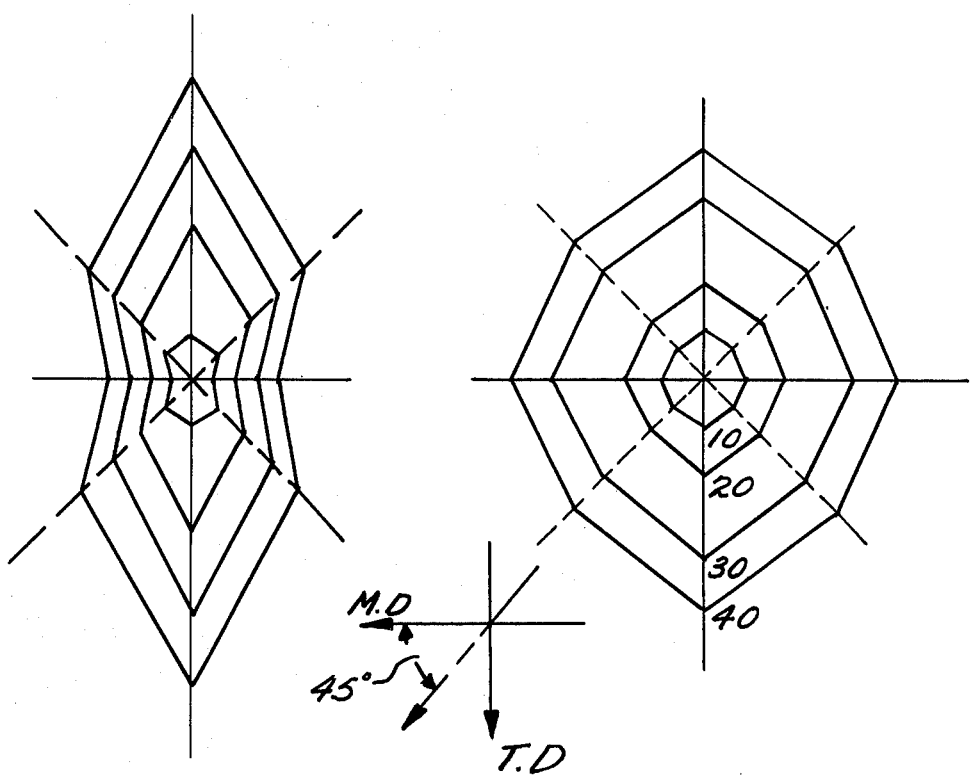
*Fig. 10.*     *Fig. 11.*

APPARATUS FOR RELAXING OR LOOSENING NEEDLED TEXTILE FABRICS

The present application is a continuation-in-part of copending application Ser. No. 221,614 entitled NEEDLED TEXTILE FABRIC, filed on Jan. 28, 1972, now U.S. Pat. No. 3,817,820 and the entire disclosure thereof is incorporated herein by reference.

BACKGROUND OF THE INVENTION

The present invention relates to apparatus and methods of relaxing or loosening textile fabrics. More particularly, the invention relates to apparatus and methods for mechanically relaxing and adjusting the stresses within the fibrous structure of friction-bonded textiles. The apparatus and methods are capable of adjusting or relaxing these stresses by changing the configuration, orientation, or position of certain fibers relative to other fibers. More specifically, the present invention relates to the exertion of lengthwise compressive forces upon traveling lengths of fibrous structures.

Prior commercial devices for compressing fibrous structures or webs in the lengthwise direction have applied driving and retarding forces to the surfaces of textile fabrics by friction and thus have required application of pressure normal to the fabric surface which has impeded fiber movement and relaxation within the structure. Also these devices have been sensitive to variation in thickness and/or density of the fabrics being treated since these factors influence normal pressure and hence the magnitudes of the compressive forces being applied by surface friction. Such prior devices have therefore been largely limited to the processing of light-weight thin fabrics.

In the aforementioned copending application a particular process is disclosed for producing a needle fabric. In a preferred embodiment of that process, fibers are formed into a web of loosely matted fibers. For specific purposes, i.e., producing artificial leather, the web of fibers has a needle pick-up gradient which generally increases in the Z direction, i.e., from the back surface to the face surface of the web. The web is needled into an integral network structure of coherent intensely entangled fibers, wherein the needled structure has an overall bulk density of at least 6 pounds per cubic foot. Preferably, the needled structure has a bulk density which generally increases in the Z direction and the ratio of the bulk density at the face surface to the bulk density at the back surface is at least 2:1 and as high as 8:1, preferably between 3:1 to 5:1. The axis of the flexure of the needled structure, preferably, lies at least within 0.4, e.g., 0.3 and especially 0.2 or 0.1 of the distance from the face surface to the back surface. The needle pick-up gradient, which during needling effects the bulk density gradient, may be accomplished by positioning a plurality of superimposed layers of fibers so that the average fiber denier decreases from the back surface to the face surface and/or is accomplished by positioning the plurality of superimposed layers of fibers so that the average fiber length of the layers decrease from the back surface to the face surface. Onto the face surface of this first so needled fabric may be laid a layer or relatively fine and short, loosely matted fibers and this layer is needled into the previously needled layer until the overall bulk density is at least 8 pounds per cubic foot. The needled fabric may be thereafter wetted with a needling fluid and then further needled while wet to increase the bulk density to at least 10 pounds per cubic foot. The structure is then mechanically relaxed and densified by shrinking the fibers at and adjacent to the face surface. The needled and shrunk fabric is preferably impregnated with a filler, e.g., an elastomer, to an add-on of the dried and/or cured impregnated fabric of between 5% and 200% of the weight of the fabric. The impregnated fabric may be buffed or sanded on the face surface and/or conventional textile or conventional leather finishes are applied thereto, e.g., on the face surface. The face surface may be embossed or otherwise treated as desired. The process may be used to produce an artificial leather.

In connection with the process of the said copending application, it is important that fibers of the fabric structure be loosened and relaxed after the needling has been completed, i.e., some fibers be realigned or slipped relative to other fibers of the structure. Otherwise the tensions on the fibers resulting from the prior processing steps will prevent the needled fabric from shrinking in the desired manner and the directional modulus and forming characteristics and softness or hand of the fabric will not be as desired, e.g., for making artificial leather.

In one aspect, the pulling of the fabric through the needle looms set up a machine direction stress. In another aspect the fiber entanglement process itself orients fibers lengthwise. Accordingly, there is built up a machine direction tensile modulus which is considerably higher than the transverse or widthwise direction modulus. The machine direction and transverse tensile modulus are, therefore, out of balance.

While the relaxation and the balance of modulus in the machine and transverse directions are particularly important for producing the artificial leather of said copending application, the apparatus and methods of accomplishing that relaxation have wider applicability than only artificial leather. Thus, the invention is applicable to any textile structures which are capable of having its fibers moved by internally applied forces, e.g., nonwoven, knitted, and felted fabrics.

Efforts have been made in the art to provide mechanically relaxation of fabrics, especially woven fabrics, and U.S. Pat. No. 2,765,513 to Walton is an earlier example thereof. This approach has been subsequently improved and U.S. Pat. No. 3,426,405 to Walton is an example thereof. In this technique, planar compressive forces are applied to the fabric by action of a frictional moving surface on the surface of the fabric and a slipping engagement of the fabric with a resisting and/or driving surface. Thus, the compressive forces are applied to the surface of the fabric and fibers within the fabric are not directly engaged by the apparatus.

This technique is useful for relatively thin, woven fabrics, where surface forces can be transmitted with some efficiency to the internal fibrous structure, but the technique quickly looses its efficiency with thickness fabrics or with non-woven fabrics, especially fully needled fabrics, wherein the internal fibrous structure is not systematically and relatively uniformly associated with the surface fibrous structure.

As can be appreciated, the ability to mechanically relax or adjust inter-fiber tensions and alignments and give relief from tensile strain within a textile structure would be of considerable benefit to the art since this provides a means of adjusting modulus and improving other properties, such as flexibility, drape, formability, filtering capacity, compactness, resilience, bulk and texture, without the necessity of using solvents, heat, steam, and the like, as often practiced by prior methods.

OBJECTS OF THE INVENTION

Thus, it is an object of the invention to provide an apparatus for, essentially only, mechanically relaxing a textile structure. It is a further object to provide an apparatus with which the fabric may be mechanically relaxed in any or all directions. Another object, accordingly, is to provide an apparatus for adjusting loosening and reducing the initial tensile modulus of the structure by, essentially only, mechanical means. It is a further object to provide a relatively simple and easy to operate mechanical means for accomplishing the above. It is another object to provide methods for accomplishing the relaxation of fibers of a textile fabric with the resulting improvement in softness and hand of the fabric. Other objects will be apparent from the following disclosure and claims.

BRIEF SUMMARY OF THE INVENTION

Very briefly stated, the above objects are accomplished by feeding a non-woven needled textile structure between at least two surfaces. One of the surfaces is capable of being moved and carries thereon a multitude of discrete penetrating elements, i.e., in the form of wire-like or pin-like protuberances. The other surface is a cooperating surface. The two surfaces are spaced apart, but pressure means are provided for causing the protuberances to penetrate into the structure and the cooperating surface may also perform this function. The protuberances penetrate the structure and engage fibers of the fibers of the structure and a relative surface speed (peripheral speed) between the two surfaces causes opposing planar compressive driving forces to be applied at discrete points internally and lengthwise of the structure so as to move fibers relative to one another and to reduce the relative distance between fibers. This action of the penetrating protuberances works directly on the interior fibers to change the configuration, orientation and/or position of fibers relative to other fibers and results in a relaxation of stresses in the structure, thus, adjusting the planar modulus of the structure. During the processing, the structure changes planar dimensions but is moved at the same speed as the speed of a moving protuberance surface, when the protuberances penetrate into the structure. The structure is, thus, loosened and relaxed and the initial planar modulus is correspondingly relaxed and adjusted.

The apparatus for loosening the needled structure of the textile fabric comprising a moveable surface having discrete fabric penetrating elements projecting therefrom for penetrating the fabric and producing planar forces on the internal fibers of the fabric and a cooperating surface for cooperating with the moveable surface and providing to the fabric an opposite force to the force exerted by the moveable surface. A moving means for moving the moveable surface at a differential speed to the cooperating surface is provided, as well as feeding means for feeding the fabric between the moveable surface and the cooperating surface. Pressure means are provided for causing the penetrating elements to penetrate into the fabric. By this arrangement compressive forces are applied to the internal fibers of the fabric at discrete points by the penetrating elements and internal fibers are moved relative to other fibers. The cooperating surface may be a stationary friction surface, a moveable friction surface, or a moveable pin carrying surface. The moveable surface and the cooperating surface may be moveable in the same direction or in opposite directions.

The penetrating elements may be in the form of fabric penetrating protuberances, e.g., wires or pins, and especially card wires with kinks or bends at the outer portion. Preferably, the moveable surface has an upstanding wire-like surface and the cooperating surface is friction surface, as described.

It should be understood that the penetrating protuberances apply an internal, longitudinal compressive force (planar force) on the fibers of the structure, as opposed to a force applied only at or near the surface of the structure, in the manner discussed above in connection with the Walton patents. The penetrating protuberances engage the internal fibers and slip or reorient the fibers so as to decrease the inter-fiber tensions. In a typical embodiment, rolls are spaced apart so that the textile structure passing through the nip between the rolls is engaged by protuberances on a first roll, while the other roll, with or without protuberances, feeds or drives the fabric to the nip at a speed greater than the speed of the first roll. The protuberances penetrate into the structure and engage the fibers of the structure in such a manner that the forces applied to the fibers cause movement of the fibers and loosening of the structure to accomplish relaxation of inter-fiber tensions.

BRIEF DESCRIPTION OF THE DRAWINGS

The invention may be understood by reference to the drawings, where:

FIG. 1 is a schematic representation of one form of an apparatus useful in practicing the present invention.

FIG. 2 is a diagrammatic illustration of a simplified embodiment of FIG. 1.

FIG. 3 is an idealized illustration of the forces applied to the fibers of the needled structure while passing through the nip of the rolls of FIG. 2.

FIG. 9 is an enlarged view of the protuberances on the surface of one of the rolls of FIG. 6.

FIG. 10 is a modulus diagram of a needled fabric that has not been relaxed by compressive forces in the longitudinal direction.

FIG. 11 is a modulus diagram of the same fabric as FIG. 10, but wherein fabric has been relaxed by compressive forces in the machine directions.

DETAILED DESCRIPTION OF THE INVENTION

Figure 4:
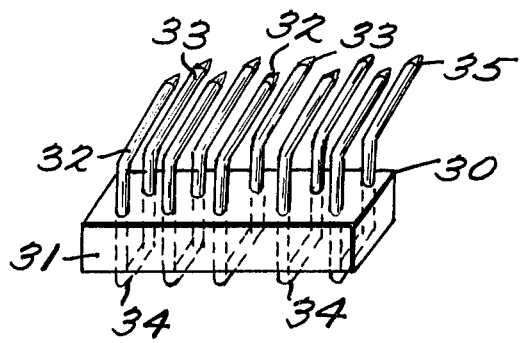
FIG. 4 is an enlarged view of the protuberances which are suitable for the surface of one of the rolls of FIG. 2.

While, as noted above, the present invention is applicable to other fibrous structures, for the sake of simplicity and convenience in this specification, the invention will be hereinafter discussed in terms of a needled fibrous structure, since that is the structure produced according to the above-mentioned copending application.

FIG. 1 schematically represents the principles involved in the present invention. This embodiment is more involved than is necessary, but is first discussed for an understanding of the critical features of the invention. In the Figure a driving roll 1 acts with a resisting roll 2. Each of the rolls 1 and 2 carry penetrating elements, i.e., protuberances 3. Confining members 4 and 4' define therebetween a confining passage 5 which has a length L, determined by the vertical distance between driving roll 1 and resisting roll 2. A needled structure (fabric) 6 passes between driving roll 1 and confining member 4 to enter confining passage 5.

In operation, the peripheral speed of driving roll 1 is greater than that of resisting roll 2. The protuberances 3 on each roll penetrate into the fabric 6 and internally engage fibers therein. The penetration of the fabric by the protuberances prevents the fabric from slipping while in contact with either roll 1 or roll 2. In effect, the force exerted by driving roll 1 on the fabric is opposed by a force generated by the resisting roll 2. Thus, since the peripheral speed of roll 1 is greater than roll 2, the fabric must be mechanically compressed in the planar direction (along the length of the fabric) while in confining passage 5. The confining members 4 and 4' prevent Z direction buckling (normal to the plane of the fabric). This compression is shown in the drawing by the relative closeness of fabric lines 7. The confining members may also be spring loaded to provide further resisting force via surface friction. For some applications the roll 2 can be omitted and all the necessary resisting force provided by converging confining members. When the compressed fabric passes from passage exit 8, some of the compression of fabric 6 will be lost as shown by the spacing of fabric lines 7' thereat, but a significant portion of that compression will be retained.

In view of the above described operation, it is clear that the protuberances on the rolls must substantially penetrate into the fabric to apply internal driving and resisting forces. Thus, the protuberances must have a shape, e.g., as pins, wires, needles, etc. suited to accomplish this required function. Further the protuberances must prevent slippage between the fabric and roll 1 and roll 2. Also, as will be explained hereinafter, the protuberances must have a shape to allow this disengagement from the fabric without breaking the protuberances or substantially tearing the fabric.

As can also be appreciated, aside from the resisting forces (opposite forces) due to surface friction, the confining members do not contribute to the operation. Thus, the length of the passage L could be quite small. Indeed, where buckling of the fabric can be avoided, L can be O, i.e., roll 1 may be positioned relative to roll 2 in such a manner that the nip formed between the rolls functions as the confining passage. Such an arrangement is shown in FIG. 2.

Thus, in FIG. 2 there is shown a simplified embodiment of FIG. 1. In this Figure, fabric 11 is passed into the apparatus, generally designated as 12, and between the nip formed by two counter rotating rolls 13 and 14. In such an embodiment the distinction between the driving roll and the resisting roll is less pronounced, but the roll with the greater peripheral speed is the driving roll. In this illustration roll 14 is the driving roll and roll 13 is the resisting roll. For purposes of this illustration, roll 13 is shown as a larger diameter roll than roll 14, but this is not necessary and the roll 14 could be equal to or greater than the diameter of roll 13. Roll 13 carries on its periphery a multitude of penetrating protuberances in the form of upstanding pins or wires 15. The protuberances 15 project from the surface of roll 13, in a curved or angled manner. Suitably, the protuberances have a kink or bend which positions the outer portion or tip thereof in a direction opposite to the direction of rotation of roll 13, the function of which will be explained hereinafter. Roll 14 has a friction surface 17, which may be a nonslip rubber coating, e.g., a rubber coating with an abrasive or grit therein. It is, however, critical that roll 14 not slip in the same direction as movement of fabric 11. To fully avoid slippage, protuberances as in FIG. 1 (or in FIG. 6) may be used. The revolutions per minute of rolls 13 and 14 are so adjusted that there is a difference in the linear peripheral surface speeds of the rolls. This difference in peripheral surface speeds of the two rolls may be accomplished in any way desired, such as gear and chain assemblies driven from a common motor or other power source, or independent adjustable speed motor drives. In any event, the speed of the fabric is approximately equal to the speed of the driving roll 14 and the fabric, therefore, has a greater speed as compared with resisting roll 13. Note that since the fabric changes planar dimensions during processing, the term "speed of fabric" depends on the point in the process where it is being referenced.

The fabric to be loosened is passed through the nip of the rolls 13 and 14. When the peripheral surface speed of roll 13 is less than the surface speed of roll 14, internal retarding forces are applied by the pins of roll 13 to the fabric in the direction opposite to the movement of the fabric. Roll 14 has the greater peripheral speed and the opposite forces are applied to the fabric by roll 14. Thus, whether the protuberance carrying roll 13 is the slow roll or the fast roll the friction roll 14 will produce forces opposite to that of the protuberance carrying roll.

FIG. 3 is a highly idealized illustration of the foregoing fiber relaxation mechanism accomplished by the devices of FIG. 1 and 2. In FIG. 3, and in connection with FIGS. 1 and 2, a fabric 2 having idealized fibers 21 is moved through the nip of rolls, e.g., 13 and 14, and forces, illustrated by arrows 22 and 23, are applied to the fabric as it passes through the nip. These forces work, slip and reorient the fibers relative to one another and cause compression in the lengthwise direction and reduce the tension between fibers. The distance A between the idealized fibers before the fabric is passed through the nip of rolls is reduced to distance B after passing through the nip. Of course, this also has the overall effect of compressing the fabric and causing a decrease in the length of the fabric as it passed through the nip of the rolls; the fabric width may be increased in some cases.

By adjusting the difference in peripheral surface speed between the rolls and the pressure therebetween, which directly relates to the degree of penetration of the protuberances into the fabric, the amount of working and movement of fibers 21 during one pass between the rolls can be adjusted. This adjustment of the rolls, essentially, correspondingly adjusts the forces 22 and 23 exerted on the fibers passing through the nip of the rolls. By then utilizing multiple passes through the nip of the rolls, or multiple set of rolls, the inter-fiber stresses can be loosened and the modulus of the fabric can be changed and adjusted. Thus, for example, the modulus of the fabric may be adjusted so that the fabric is essentially isotropic in modulus characteristics, i.e., the modulus of the fabric is the same in every direction. This results in a unique textile fabric with obvious advantages. Also, to build special modulus characteristics in a fabric, the fabric may additionally be run through the nip of the rolls in both the machine direction and the transverse direction, as well as the angles therebetween. This will allow the building of specific modulus in all, or any desired, direction.

The pressure exerted on the fabric by the protuberances and thus the degree of penetration while the fabric passes through the nip of rolls can be adjusted simply by changing the distance between these rolls. This distance adjustment may be carried out by any expedient mechanical means, but simply adjustable pillow blocks holding the axles of the rolls are suitable. Alternatively, this may be done with worm screw adjustments, pneumatic cylinders, movable bearings and the like.

In connection with the penetrating proturberances, the particular form thereof is not narrowly critical, so long as the protuberances have relatively small cross-sections consistent with allowing the protuberances to penetrate into the fabric and engage the fibers thereof, in the manner discussed above. Thus, for most applications, the penetrating protuberances should have cross-sectional dimensions so that no dimension thereof is greater than ⅛ of an inch, especially no greater than 1/16, preferably about 1/32 of an inch or less. The distance from the surface of the roll carrying the protuberances to the end of the protuberances spaced from the roll is not critical, but the distance must be consistent with the thickness of the fabric so that the protuberances can substantially penetrate into the fabric to work directly on the interior fibers at discrete points. The protuberances may be made of any materail including metals, plastics and ceramics, but it is preferred that the protuberances be made of a material which has a bending modulus similar to that of metal, especially steel. Thus, with such a modulus, the forces exerted by the protuberances on the fabric as the fabric passes through the nip of the rolls will also cause a bending of the protuberances and a resulting displacement of the protuberances. After a particular portion of the fabric passes through the nip of the rolls, the pressure exerted on the fabric and on the protuberances in the nip will be released as the rolls rotate beyond the nip. Thus, the protuberances with the bending displacement, caused by the pressure, will tend to move back to the original configuration of the protuberances, and this action of the protuberances will give further movement to the fibers of the fabric. However, even more importantly, with substantial penetration into the fabric, it is most difficult to withdraw the protuberance from the fabric after the fabric passes the nip of the rolls unless the ends of the protuberances are disposed in a direction opposite the movement of the rolls. Without such arrangements the fabric may be torn or otherwise damaged. In view of this, a bent configuration of the protuberances is preferred, i.e., at their outer ends, and the protuberances are displaced in directional orientation from the perpindicular to the surface of the roll in a direction opposite to the direction of movement of the roll (and fabric). This can be seen from FIGS. 1 and 2 where the outermost portion of the protuberances has a curvature (kink or bend) 15 in a direction opposite to the movement of the fabric. The curvature in this opposite direction allows the fabric to be smoothly released from the protuberances after the fabric passes through the nip of the rolls. When the curvature is in the direction opposite to the movement of the fabric, the protuberances retract from the fabric in a manner which reduces the tendencies of the protuberances to break or the tendency to tear or otherwise deteriorate the fabric due to the cutting action.

The protuberances may be formed on the roll by any desired means but, suitably, the protuberances are simply mounted in a base, which base may be mounted on the roll in any desired manner, including mechanical restraints such as screws, bolts and the like, cemented or soldered on the roll or alternately held on the roll simply by frictional engagement with the roll. The base may be rigid or flexible but it is preferred that a flexible base be used, since this allows movement of the protuberances mounted therein so as to provide additional flexure of the protuberances, in the manner noted above. Thus, the combination of a bendable protuberance, such as steel, in a flexible base will allow greater movement of the protuberances as the protuberances engage the fabric in the nip of the rolls. The flexible base may be made of any desired flexible material, including elastomers such as natural and synthetic rubbers, but quite suitably the base may simply be a heavy textile material in the nature of a base for a conventional card wire.

Very suitably the protuberance/base combination may be a conventional card clothing, e.g., "fillet" wire, "metallic" wire or "saw-tooth" wire. Accordingly, for a simple construction of the present invention, the protuberances may be kinked or bent card wire with the conventional card wire base (clothing) and the base and wires mounted on the rolls in a conventional manner for card clothing.

Whatever penetrating elements are used, it should have sufficient stiffness so that they may penetrate the fabric at discrete points and thereby move individual fibers relative to one another. Also, it is necessary that the wires present a total surface which is sufficient to apply substantial forces to individual fibers directly within the fabric at discrete points and move those individual fibers relative to one another, as discussed in connection with FIGS. 1, 2 and 3.

While as is noted above, conventional card wires are acceptable for optimum results, a series of simple expriments can determine the optimum wires for use with any particular fabric and consistent with the degree of loosening required. Thus, by simply changing the length, size and number of wires carried on the roll in orderly progressions, and then measuring the degree of relaxation accomplished with any particular fabric in one or multiple passes, one can optimize the particular wires used for particular fabrics.

FIG. 4 is an enlarged view of suitable penetrating elements as may be carried on the surface of roll 1 or 2 or roll 13 of FIGS. 1 and 2, respectively. As shown in FIG. 4, a card-wire-like structure 30 has a fabric base 31 and wire-like protuberances 32 and 33 extending from the fabric, preferrably, in a bent or kinked configuration. Protuberances 32 and 33 may be the ends of a staple-like structure which is stapled from the backside of fabric 31. Protuberances 32 and 33, therefore, are joined on the backside of the fabric by the common element 34 of those protuberances. Note that the protuberances may have pointed or rounded or sharpened ends generally referenced at 35.

Figure 5:
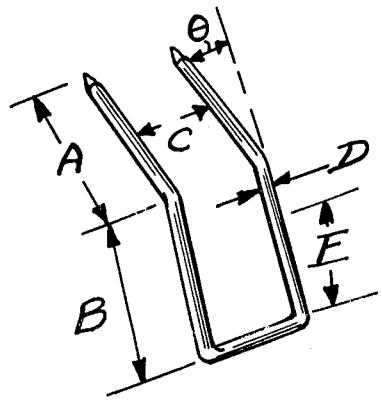
FIG. 5 is an illustration of a suitable form of protuberances of FIG. 4.

FIG. 5 shows a single staple element of the fillet card wire of FIG. 4. In FIG. 5, the distance E indicates, generally, the thickness of fabric 31 of FIG. 4. The dimensions A and B may be approximately equal but ratios of A and B of 1:3 to 3:1 are acceptable. C may be about ¼ to 2 times the distance of A, but preferably C is about ½ to ¾, e.g., ⅔ of A. The angle θ may be from 0° to 60°, but from about 10° to 45° is preferred, e.g., about 30°. The thickness D is suitably from about 5 to 200 mills, but preferably less than 100 mils, and more preferably less than 50 mils, e.g., between 10 and 20 mils. Preferably, the ratio of length (above the base) to diameter of the wire should be between 3:1 to 100:1.

Figure 6:
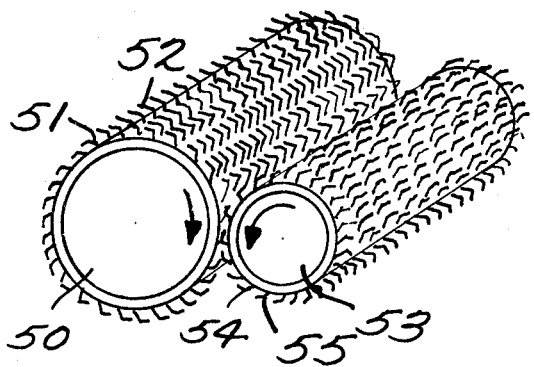
FIG. 6 is another embodiment of the apparatus wherein both rolls carry protuberances thereon.

FIG. 6 shows a simplified embodiment of FIG. 1 where both rolls carry protuberances. In FIG. 6, roll 50 carries protuberances 51 which protuberances have a kink or bend 52 therein. The direction of the kink is opposite to the direction of rotation of roll 50. Likewise, roll 53 carries protuberances 54 which protuberances have a kink or bend 55 therein. The kink or bend is also in a direction opposite to the direction of rotation of roll 53. However, quite suitably, the protuberances on one of roll 50 or roll 53 may be perpendicular to the surface of the roll and have no kink therein. In this modification, however, the protuberances on the roll may be of a non-penetrating character and configuration to provide only a non-slip surface, in the manner or roll 14 of FIG. 2, i.e., the non-slip protuberances would not substantially penetrate into the fabric. Thus, for example, the non-slip protuberances could extend from the surface of the roll a distance substantially less than the thickness of the fabric, e.g., a distance less than ½, more preferably less than ¼, e.g., ⅛th of the thickness of the fabric being treated. Or, the non-slip surface may simply be a deeply grooved or knurled surface and not be a wire-like protuberance at all.

Figure 7:
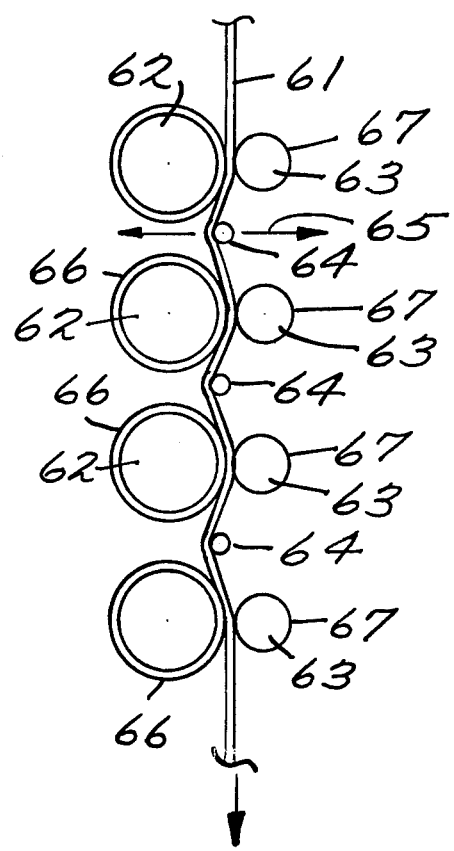
FIG. 7 is an illustration of a machine having multiple sets of rolls according to FIG. 2.

FIG. 7 shows an embodiment where a plurality of sets of rolls, in the nature of those shown in FIG. 2 are arranged in series for successive treatment of a fabric. The fabric 61 is passed successively through the nip formed by four sets of rolls 62 and 63. Between each set of rolls may be an idler roll 64 which is capable of maintaining a preset tension by automatic lateral adjustment. However, the idler roll may not be required. Rolls 62 have a protuberance carrying surface 66, in the manner of roll 13 in FIG. 2. Rolls 63 have a friction surface 67, in the manner of roll 14 of FIG. 2. Idler rolls 64 may be arranged with any device desired (not shown) for maintaining a relatively constant tension on fabric 61. For example, opposing pneumatic or hydraulic cylinders, springs and the like, may allow idler rolls 64 to be moved laterally to take up slack or let out slack in fabric 61, as required, as the fabric passes through the series of nips and is thereby shortened in the machine direction length.

Rolls 62, 63 and 64 may be supported by any convenient form of axle and superstructure, but a simple system of pillow blocks and supporting beams on vertical strain rods is satisfactory. Either roll 62 or 63 may be driven from independent sources, e.g., motors, or a single source may drive all of the driven rolls 62 and 63. When a single driving source is used, appropriate gears, chains, pulleys and the like may be used for accomplishing the differences in peripheral speeds as discussed above. In other regards, the operation of the series arrangement shown in FIG. 7 is the same as that illustrated in FIG. 2.

The present method and apparatus, working on internal fibers, can continue to loosen the structure with successive passes through the machine. This is not true with surface force exerting machines as those of the aforenoted patents, and this is an important feature of the present invention.

Figure 8:
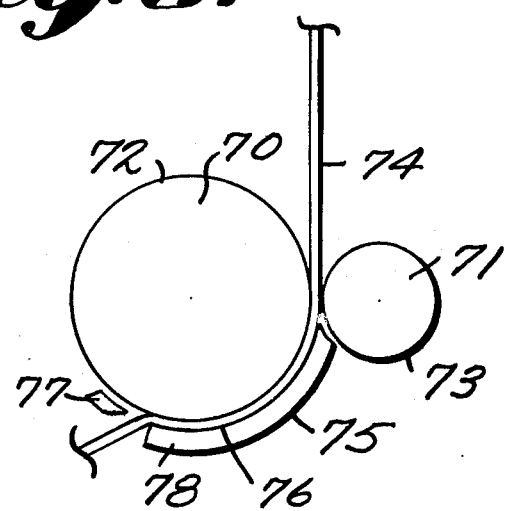
FIG. 8 is a modification of FIG. 2 wherein heating or steaming devices are placed about the rolls of FIG. 2.

FIG. 8 is a diagrammatic illustration of an embodiment where the rolls of the present invention additionally are associated with a heating device and optionally with a fabric removing device. In FIG. 8, a nip is formed between rolls 70 and 71. Roll 70 has a surface 72 which surface carries protuberances in the nature of the protuberances of roll 13 of FIG. 2. Roll 71 has a surface 73 which is a non-slip surface in the nature of the surface of roll 14 of FIG. 2 or the non-kinked protuberances of roll 53 of FIG. 6. A fabric 74 passes through the nip formed between roll 70 and 71 and while impaled on the protuberances of surface 72 against a heating device 75 and is removed from roll 70 by a comb 77. Of course, the heating device and comb may be disposed about roll 71 instead of roll 70, if desired. The heating device may be heated by any convenient means including internal electric heaters, steam, hot fluids and the like. When the fluid is an inert material, such as steam, air, nitrogen and the like, the inside surface 76 of heating device 75 may have orifices therein which inject the heated fluid, e.g., steam into and through the fabric 74.

When the fabric has been mechanically relaxed by passing through the nip between rolls 70 and 71, heating device 75 can sufficiently heat the fabric to cause some further thermal relaxation and/or heat setting of the fibers of the fabric. Additionally, if the fabric is made of heat-shrinkable fibers, heating device 75 may cause shrinkage of the fabric. The heating device may be used in combination with any of the embodiments of the present invention.

The temperature of the heating device, especially at the inside surface thereof which contacts the fabric, should be consistent with relaxing and/or heat setting temperature of the fibers of the fabric. While this temperature of the heating device may vary with the time that the fabric contacts the device (i.e., the inside surface length and speed of fabric) as well as with the particular fibers of the fabric, most thermoplastic textile fibers are sufficiently heated with temperatures of up to 500° F to 600° F at the inside surface. In any case, the temperature and the time of contact should not be such that deterioration of the fibers in the fabric take place. For example, when the fabric is made of conventional polyester fibers, temperatures up to 275° F to 375° F are appropriate at the surface of the heating device, although temperatures outside of this range may be used.

The comb 77 is suitably a conventional card comb which is oscillated in a conventional manner to remove the fabric 74 from roll 70. Thus, the comb will oscillate in a manner such that the comb moves in and out of the nip formed between roll 70 and end 78 of heating device 75. The comb is oscillated (means not shown) in the same manner as a conventional card comb, e.g., up to about 60 oscillations per minute, although oscillations outside of this range may be used if desired. The teeth of the comb may be the same as a conventional card comb, although greater spacing or more closely packed teeth, with less depth or greater depth, may be used. Indeed, a simple bar with a sharpened edge can be used as a comb in this embodiment.

From the foregoing it can be appreciated that the invention, in a major aspect, is aimed at causing fibers within the fabric to be directly worked on at discrete points and mechanically moved in order that the fibers may reorient in a configuration which loosens and reduces interfiber tensions. This direct working of the fibers to cause movement must involve fibers that are disposed in the interior of the fabric as well as at or near the surface of the fabric in order that the overall properties, especially modulus, of the fabric be substantially changed. To this end the penetrating protuberances must apply compressive forces at discrete internal points in the fabric. Accordingly, as discussed above, the size and shape of the protuberances must be such that they can penetrate well within the particular fabric being processed and be capable of moving at a differential speed. Since multiple passes of the fabric through the present device may be used to ultimately provide the final physical properties of the fabric, the conditions of penetration and movement of the protuberances are not narrowly critical for any one pass. However, at least one pass should cause the free end of protuberances to penetrate at least ¼ through the thickness of the fabric and preferably at least ⅓. Greater penetrations are normally performed, e.g., at least ⅜ to ½ to ¾ of the thickness of the fabric and the protuberances, for some fabrics, may pass all the way through the thickness. Thus, the length of the protuberances should correspond in the aforenoted manner with the thickness of the fabric, e.g., to fully penetrate the fabric they must be longer than the fabric is thick. Of course, where the fabric is subjected to multiple passes through the device with the fabric surface previously next to the moving surface reversed so that the protuberances subsequently contacted the opposite surface of the fabric, the foregoing minimum penetration can be essentially halved. The same is true when both the fabric planar surfaces are acted upon by moving protuberance carrying surfaces, for example, as illustrated in FIG. 6 and discussed previously.

A unique feature of the present invention is the application of compressive forces at discrete internal points in the textile fabric structure. From the foregoing discussion it should be clear that either the required driving or retarding forces or both can be so applied. Alternately, in conjunction with a moving surface with a plurality of protuberances for exerting forces internally, either a friction roll for applying a driving force by means of surface friction or a friction roll or friction surfaces for applying a retarding force by means of surface friction is within the scope of the present invention.

The relative movement between the protuberances and the fabric can also vary with the number of passes the fabric makes through the device. However, for most fabrics, the protuberances must have a corresponding planar speed at least 5% greater than the speed of the fabric and preferably at least 10% or 20%. However, the differential may be much greater, e.g., up to 30% to 45% or even as high as 100% or more. A differential speed of between 20% and 35% is a preferred embodiment.

EXAMPLE

A needled fabric composed of polyester staple fibers (1 ½ to 5 denier and 1 ½ to 3 inches crimped fibers) was produced in accordance with Example 1 of the aforementioned copending application, Ser. No. 221,614. A FIBERWOVEN loom needled the mat of fibers in three needling operations until there were approximately 6,658 needle punches per square inch on each side of the fabric. After the three needling operations, the resulting needled fabric had an increase in overall length, as opposed to the original length of the substantially unneedled fabric, of about 40%. The fabric was passed through four sets of rolls, in series, as shown in FIG. 7. Each of rolls 62 of that Figure carried a wire surface as shown in FIGS. 4 and 5 and wherein the staples of the card wire surface had an angle θ of 30°, A and B were approximately equal and C was ⅓ of A or B. A and B were about 3/16th inch and the diameter D of the wire was approximately 15 mils. The wire had a rounded end. Each of rolls 63 carried a wire surface as shown in FIG. 9 where A is ⅜ inch, B is ¼ inch, C is ¼ inch and D is ¼ inch. However, for more generally use A may be from ⅛ to ½ inch, B may be from 1/16 to ¾ and C and D may be from 1/16 to 1 inch. The peripheral speed of rolls 63 was approximately 35% greater than the peripheral speed of rolls 62. In this example, however, idler rolls 64 were not used and the fabric was fed directly from nip to nip of the series of rolls. A heated shoe, as shown in FIG. 8, having an inside surface temperature of 370° was used only on the last roll of the series of rolls of FIG. 7 and a 20 cycle per second oscillating card comb, as set forth in connection with FIG. 8, was used to remove the fabric from the last roll. Prior to passing through the machine, the modulus of the fabric was similar to that of FIG. 10. After passing through the machine the modulus of the fabric was similar to that shown in FIG. 11.

While the foregoing disclosure references rolls, belts and other like moveable surfaces may be used. Also, while both the moveable surface and cooperating surface is preferably moved, only the moving surface need be moved. The cooperating surface can provide the opposite force by friction and without moving. On the extreme, the cooperating force could move in a direction opposite to that of the fabric but in this case, of course, it must slip. Also, it is not necessary that the surface with the protuberances move at a continuous speed. The fabric may pass through rolls or surfaces which have discontinuous or pulsating movement. This pulsating movement provides an additional advantage in that the start/stop motion produced in the fabric further causes fibers in the fabric to move and reorient, which decreases inter-fiber tension. This pulsating movement may be produced with a rotating moving surface, if desired. Thus, the rolls of any of the Figures could carry a ratchet drive to produce this pulsating motion. Accordingly, the specification and claims are intended to embrace a pulsating movement.

What is claimed is:

1. An apparatus for loosening the needled structure of a textile fabric having an overall bulk density of at least 8 pounds per cubic foot comprising:
   (1) a moveable surface having discrete fabric penetrating elements projecting therefrom for penetrating the fabric and producing planar forces on the internal fibers of the fabric;
   (2) a moveable cooperating friction surface for cooperating with the moveable surface and providing to the fabric an opposite force to the force exerted by the moveable surface;
   (3) moving means for moving the cooperating friction surface and moving means for moving the moveable surface in the same direction as the movement of the cooperating surface but at a differential speed to the cooperating surface of at least 10%;
   (4) feeding means for feeding the fabric between the moveable surface and the cooperating surface; and (5) pressure means for causing the penetrating elements to penetrate into the fabric; said cooperating friction surface having frictional characteristics such that the cooperating surface will not slip in the direction of movement of the fabric whereby compressive forces are applied to the internal fibers of the fabric at discrete points by the penetrating elements and internal fibers are moved relative to other fibers.

2. The apparatus of claim 1 wherein the penetrating elements are in the form of fabric penetrating protuberances.

3. The apparatus of claim 2 wherein the penetrating protuberances are in the form of wires or pins.

4. The apparatus of claim 3 wherein the wires are in the form of card wires.

5. The apparatus of claim 4 wherein the card wires are in the form of kinked card wires.

6. The apparatus of claim 1 wherein the moveable surface has an upstanding wire-like surface and the cooperating surface has a friction surface.

7. The apparatus of claim 6 wherein the said moveable and cooperating surfaces are disposed on two counter rotatable rolls, one of the rolls carrying the wire-like surface and the other of the rolls carrying the frictional surface and the friction surface also functions as the feed means.

8. The apparatus of claim 6 wherein the wire-like surface has wire-like protuberances which are of a suitably small size as to penetrate the fabric and engage fibers and move those fibers relative to other fibers to cause loosening of the fabric.

9. The apparatus of claim 8 wherein the protuberances have a curvature which positions the outer portion of the protuberance in a direction opposite to the direction of rotation of the roll upon which the protuberances are mounted.

10. The apparatus of claim 6 wherein the friction surface is a non-slip rubber surface.

11. The apparatus of claim 6 wherein the friction surface comprises wire-like protuberances.

12. The apparatus of claim 6 wherein the moving means moves the moveable surface and that the difference in relative surface speed between the moveable surface and the cooperating surface is about 10% and 45%.

13. The apparatus of claim 12 wherein the difference in surface speeds is between about 20% and 35%.

14. The apparatus of claim 13 wherein the cooperating surface has the greater surface speed.

15. The apparatus of claim 6 wherein a heating device is disposed adjacent one of the surfaces over which the fabric passes.

16. The apparatus of claim 6 wherein the penetrating elements are of a suitably small size and shape that they are capable of penetrating the said fabric.

17. The apparatus of claim 16 wherein the moveable surface and the cooperating surface are defined by two counter rotatable rolls, one of the rolls carrying the penetrating elements and the other of the rolls carrying a frictional surface which also functions as the said feed means.

18. The apparatus of claim 17 wherein penetrating elements are in the form of penetrating protuberances and the frictional surface functions as the pressure means to force penetration of the fabric by the protuberances.

19. The apparatus of claim 18 wherein the protuberances are of a suitably small size as to engage the fibers so that the fibers are moved relative to other fibers to cause loosening of the fabric.

20. The apparatus of claim 19 wherein the protuberances are in the form of upstanding pins or wires.

21. The apparatus of claim 20 wherein the protuberances extend from the surface of a roll.

22. The apparatus of claim 21 wherein the protuberances have a curvature which positions the outer portion of the protuberance in a direction opposite to the direction of rotation of the roll upon which the protuberances are mounted.

23. The apparatus of claim 16 wherein the cooperating surface is a roll and has protuberances projecting thereon.

24. The apparatus of claim 23 wherein the rolls are adjustably driven so that the difference in surface speeds of the rolls is between about 10% and 45%.

25. The apparatus of claim 24 wherein the difference in surface speeds of the rolls is between about 20% and 35%.

26. The apparatus of claim 6 wherein the penetrating elements are in the form of protuberances having cross-sectional dimensions no greater than ⅛ of an inch.

27. The apparatus of claim 26 wherein the protuberances have cross-sectional dimensions no greater than 1/16 of an inch.

28. The apparatus of claim 27 wherein the protuberances have cross-sectional dimensions no greater than 1/32 of an inch.

29. The apparatus of claim 1 wherein the moveable surface and cooperating surface are defined by counter-rotatable rolls and a plurality of sets of said rolls are arranged in series for successive treatment of a fabric passing through the nips formed thereby.

30. The apparatus of claim 29 wherein a heating device is disposed about one of the said rolls and forms an annular portion between the said roll and the inside surface of the said heating device through which the fabric passes.

* * * * *